May 19, 1953 P. M. BRISTER ET AL 2,639,363
WELDED JOINT OF DISSIMILAR METALS
Filed June 15, 1950

INVENTORS
Paul M. Brister &
Lambert F. Kooistra
BY
*J. P. Moran*
ATTORNEY

Patented May 19, 1953

2,639,363

UNITED STATES PATENT OFFICE 2,639,363

WELDED JOINT OF DISSIMILAR METALS

Paul M. Brister, Madison, N. J., and Lambert F. Kooistra, Akron, Ohio, assignors to The Babcock & Wilcox Company, New York, N. Y., a corporation of New Jersey Application June 15, 1950, Serial No. 168,306

9 Claims. (Cl. 219—11)

This invention relates in general to the construction of welded joints of dissimilar metals, and more particularly to such joints designed for use in tubular conduit members containing a fluid at high temperatures and under high pressures, with the joint being subject to cyclic temperature variations during its normal service life.

The general trend in modern steam power plants, for example, is toward increased pressures and higher temperatures which in turn require thicker sections in piping, valves, and structural members where strength is a major consideration. In order to minimize resulting fabrication difficulties, weight and costs, materials of greater load-carrying ability at elevated temperatures have come into use. Various austenitic high chromium-nickel alloy steels have come into use for this service. These austenitic alloys differ from the lower strength ferritic alloy steels in some important physical properties, such as thermal conductivity, coefficient of expansion, and modulus of elasticity.

Steam boilers are now being designed for outlet steam temperatures of 1050° F. at pressures up to and above 2000 p. s. i. The metals for steam conduits for such service must successfully withstand oxidation, must be suitable for manufacture into tubular materials, must be able to withstand the internal pressure at the metal temperature and, because of the quantity required, be economical. The external steam piping leading to the steam utilizing device, such as a steam turbine, is ordinarily made of a ferritic metal, such as 2¼Cr–1Mo alloy steel. However such ferritic piping is connected to turbines which have been furnished with valves and inlet piping of austenitic metal, such as 18Cr–8Ni alloy steel, thereby necessitating a dissimilar metal joint therebetween.

The joining of such dissimilar ferritic and austenitic alloy members presents design and fabrication problems. Mechanical joints for high temperatures and pressures are large and cumbersome and present inherent difficulties. Welded joints have been found desirable but offer problems due to differences in the physical and metallurgical characteristics of the ferritic and austenitic materials. Austenitic weld metal, such as 19Cr–9NiCb, has generally been the choice for such joints because of its high temperature strength and ductility.

Dissimilar metal joints of this character have heretofore had their service life estimated primarily from their metallurgical aspects, i. e. the ability of the joint to withstand high temperature oxidation and the stresses due to the operating pressure-temperature conditions.

Thermal cyclic tests of such joints intended to simulate operating conditions occurring when the steam boiler is started up and shut down indicate a tendency towards failure of the joint along and adjacent to the line of fusion on the ferritic side of the weld. It is believed that the failure potentiality of a dissimilar metal joint is increased considerably by the thermal and residual stresses produced by the cyclic temperature variations to which such joints are ordinarily subjected. Secondary causes, such as oxidation fatigue, carbon migration and poor welding techniques contribute to failure of the joint. Austenitic and ferritic alloy steels have substantial differences in thermal conductivity and coefficients of expansion. For example, an 18Cr–8Ni alloy steel has a coefficient of linear expansion in the temperature range of 70° F. to 1300° F. of $10.75 \times 10^{-6}$ inch per inch per degree Fahrenheit, while a ferritic 2¼Cr–1Mo alloy steel has, for the above temperature range, a coefficient of $7.88 \times 10^{-6}$. Upon heating such a dissimilar metal joint which has been welded with an austenitic weld metal such as 19Cr–9NiCb, the expansion stresses produced during a wide temperature change as a result of the 36% difference in the coefficients of linear expansion may approach yield point level at a narrow band along the junction of the two materials.

Thus major operational stresses result from the differential expansion and differences in thermal conductivity of the ferritic and austenitic materials. Stresses due to differential expansion vary in magnitude with temperature changes and are usually at a maximum just after a major temperature change. Thermal stresses are produced only during rapid heating and cooling cycles and substantially disappear at stable operating and at atmospheric conditions. The safe operating limit for a dissimilar metal weld therefore appears to be a function of the operating temperature and the rate and degree of temperature cycling.

In accordance with the present invention, the normal service life potential of dissimilar metal welded joints intended for use under varying high temperature and high pressure operating conditions is considerably increased by the provision of means for substantially reducing the magnitude of differential stresses due to cyclic temperature changes. The provisions for this purpose preferably consist of means for externally heating the welded joint and adjacent areas to maintain the joint metal temperature above a predetermined value. Electrical resistance heating means are preferred for this purpose and are advantageously constructed so as to avoid the flow of electrical currents, by induction or otherwise, through the metal of the joint and to insure a substantially uniform heating of the joint metal even on partial failure of the heating means.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which we have illustrated and described preferred embodiments of our invention.

The invention is illustrated as used on a welded joint of dissimilar metals, such as a butt-welded connection in a high temperature high pressure superheated steam conduit connection formed, for example, of a tubular member 10 of an austenitic steel alloy, such as 18% chromium, 8% nickel stabilized with columbium, and a similar conduit section 12 of a ferritic alloy steel, such as 2¼% chromium, 1% molybdenum alloy, butt-welded in a well known manner with an austenitic alloy weld metal 14, such as 19% chromium, 9% nickel, columbium stabilized alloy steel. A welded joint of this character and for such use would be ordinarily subjected to cyclic temperature variations on shut-downs of the associated steam generating and/or utilizing apparatus and accordingly subjected to the stresses hereinabove described.

Figure 2:
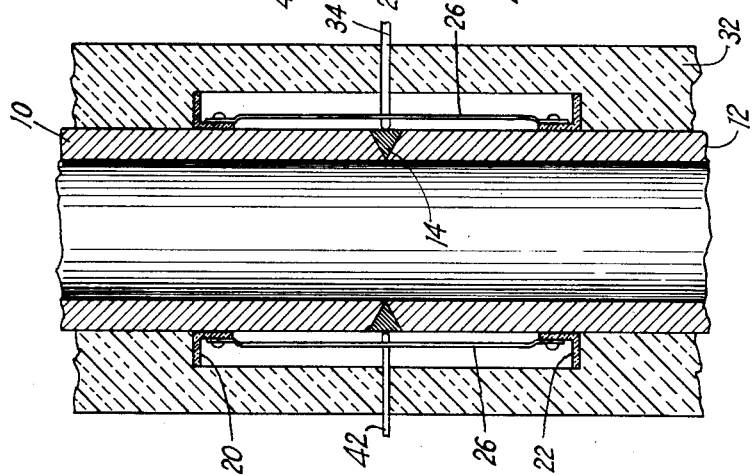
Fig. 2 is a sectional elevation of the apparatus shown in Fig. 1.
Figure 1:
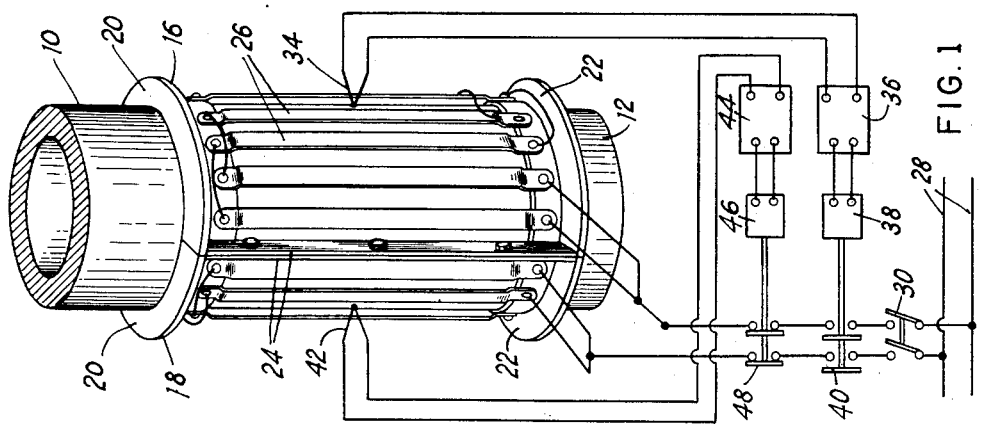
Figure 1 is a partly diagrammatic elevation of a welded joint of dissimilar metals to which the invention is applied, the external insulation being omitted for purposes of clarity.

In accordance with the invention the normal service life potential of such joints can be considerably increased by the provision of means for substantially reducing the magnitude of the stresses caused by such cyclic changes in the associated apparatus. The provisions for this purpose, as shown in Figs. 1 and 2, advantageously consist of an electric heating unit surrounding the welded joint and adapted to heat a length of pipe adjoining the weld equal to approximately twice the outside diameter of the pipe. The heating unit is split longitudinally into two sections 16 and 18, to facilitate its installation and removal. Each section is formed by a semi-cylindrical framework of any suitable electrical insulating material having longitudinally spaced semi-circular collars 20 and 22 of L-shaped cross-section connected at their corresponding ends by side flanges 24. The corresponding side flanges of the sections are connected in any suitable manner to removably mount the heating unit on the pipe in contact with the surface thereof.

The heating elements are preferably of the straight resistance type, so as to avoid any electrical currents being created by induction or otherwise in the metal of the joint. Induction currents in a dissimilar metals joint are believed to have an adverse effect on carbon distribution in the metal structure at high operating temperatures. The heating elements consist of circumferentially spaced longitudinally extending metallic strips 26, mounted on the pipe-contacting portions of the insulating collars 20 and 22 and slightly spaced from the surface of the pipe, as indicated in Fig. 2. The heating elements 26 are uniformly spaced circumferentially and connected in two parallel electrical circuits, alternate elements 26 being connected in series, as indicated in Fig. 1. With this arrangement and connection of the heating elements, asymmetrical heating of the joint area is avoided even if one of the heating circuits should be broken. The heating circuits receive power from a suitable electrical source 28 controlled by a manually operated double pole switch 30. The heating unit is completely covered with a layer of high temperature insulating material 32, as indicated in Fig. 2.

As diagrammatically illustrated in Fig. 1, an automatic temperature control is provided for rendering the heating circuits operative whenever the joint metal temperature decreases to a predetermined temperature value which is usually set at a temperature of 100–200 degrees F. below the metal temperature at the weld under normal operating conditions. For example, if the normal metal temperature should be 1000 degrees F., the heating system would be set to render the heating circuits operative when the metal temperature fell to a predetermined point in the range of 800–900° F. The provisions for this purpose consist of a thermocouple 34 peened on the weld metal and connected to a suitable temperature control device 36, which operates through a relay 38 to close a normally open switch 40 in the power line when the weld metal temperature drops to the predetermined value, thereby energizing the heating circuits. With the heating elements so energized, the welded joint is rapidly heated by radiation thereto over an area approximating in length twice the outside diameter of the pipe.

A temperature limit control is also provided to deenergize the heating circuits when the welded joint temperature rises above a predetermined value. For this purpose, a second thermocouple 42 is peened on the weld metal and connected to a temperature limit control device 44, which operates through a relay 46 to open a normally closed switch 48 in the power line when the metal temperature rises during the heating period to a predetermined value. The upper temperature limit is set at a point slightly below the normal operating weld metal temperature. The temperature controls are arranged to return each switch to its normal position when the other switch is actuated. It has been established that the weld joint stresses in the temperature range indicated for the on and off control points described are of small degree and have no deleterious effect on the welded joint.

Figure 3:
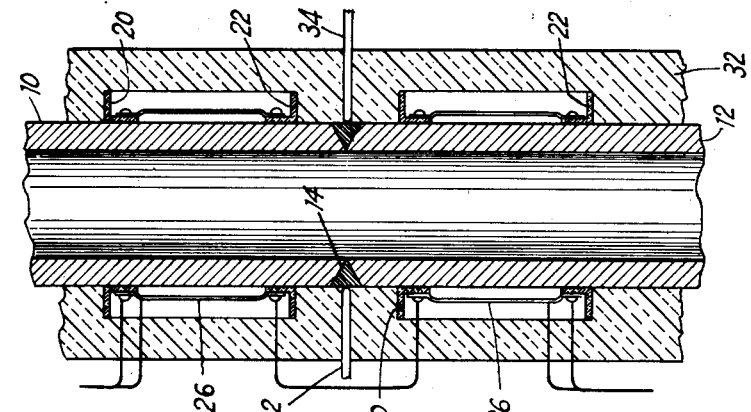
Fig. 3 is a view similar to Fig. 2 of a modified heater construction.

In the modified construction shown in Fig. 3 two heating units of the character described, but of shorter length, are mounted on opposite sides of and slightly spaced from the welded joint. This spaced arrangement of the heating units permits complete inspection of the weld without the necessity of removing the heating units from the pipe.

With the described arrangements, the welded joint can be maintained near its normal metal operating temperature during periods when the associated steam generating or utilizing apparatus is shut down for any reason. Such shutdowns are infrequent in a modern steam boiler, for example, so that the electric power consumption for heating the joints at such times will represent only a small portion of the annular operating expense.

We claim:

1. In combination, a welded joint formed by and between dissimilar metal members having different thermal coefficients of expansion, and normally subject to relatively wide cyclic temperature variations during service, and means for controlling the temperature of said welded joint to within an elevated temperature range substantially less than that of such cyclic temperature variations and adjacent the upper limits of the latter comprising heating elements spaced peripherally of and mounted on said metal members and arranged to heat the portions of said metal members adjoining said weld.

2. In combination, a welded joint formed by and between dissimilar metal members having different thermal coefficients of expansion, and normally subject to relatively wide cyclic temperature variations during service, and means for controlling the temperature of said welded joint to within an elevated temperature range substantially less than that of such cyclic temperature variations and adjacent the upper limits of the latter comprising electrical resistance heating elements spaced apart peripherally of said metal members and arranged to radiantly heat the portions of said metal members adjoining said weld.

3. In combination, a welded joint formed by and between dissimilar metal tubular conduit members having different thermal coefficients of expansion, and normally subject to relatively wide cyclic temperature variations during service, and means for controlling the temperature of said welded joint to within an elevated temperature range substantially less than that of such cyclic temperature variations and adjacent the upper limits of the latter comprising electrical resistance heating elements uniformly spaced apart circumferentially of said tubular conduit members and arranged to radiantly heat the portions of said tubular conduit members adjoining said weld.

4. In combination, a welded joint formed by and between dissimilar metal tubular conduit members having different thermal coefficients of expansion, and means for uniformly heating said welded joint comprising electrical resistance heating elements uniformly spaced apart circumferentially completely around said tubular conduit members and arranged to radiantly heat the portions of said tubular conduit members adjoining said weld, and means for connecting the alternate heating elements around the entire circumference of the joint in a first electric circuit and the heating elements intermediate such alternate heating elements in a second electric circuit in parallel with said first electric circuit.

5. In combination, a welded joint formed by austenitic and ferritic alloy steel tubular conduit members having different thermal coefficients of expansion and connected by austenitic alloy steel weld metal, and normally subject to relatively wide cyclic temperature variations during service, and means for controlling the temperature of said welded joint to within an elevated temperature range substantially less than that of such cyclic temperature variations and adjacent the upper limits of the latter comprising longitudinally spaced groups of electrical resistance heating elements uniformly spaced apart circumferentially of said tubular conduit members and arranged to radiantly heat the portions of said tubular conduit members at opposite sides of and adjoining said weld.

6. In combination, a welded joint formed by and between dissimilar metal members having different thermal coefficients of expansion, and normally subject to relatively wide cyclic temperature variations during service, means for controlling the temperature of said welded joint to within an elevated temperature range substantially less than that of such cyclic temperature variations and adjacent the upper limits of the latter comprising electrical resistance heating elements spaced apart peripherally of said metal members and arranged to radiantly heat the portions of said metal members adjoining said weld, means for automatically energizing said heating elements when the temperature of said welded joint drops to a predetermined value, and means for automatically deenergizing said heating elements when the temperature of said welded joint rises to a predetermined value.

7. In combination, a welded joint formed by austenitic and ferritic alloy steel tubular conduit members having different thermal coefficients of expansion and connected by austenitic alloy steel weld metal, and normally subject to relatively wide cyclic temperature variations during service, and means for controlling the temperature of said welded joint to within an elevated temperature range substantially less than that of such cyclic temperature variations and adjacent the upper limits of the latter comprising electrical resistance heating elements uniformly spaced apart circumferentially of said tubular conduit members and arranged to radiantly heat the portions of said tubular conduit members adjoining said weld, means for automatically energizing said heating elements when the temperature of said welded joint drops to a predetermined value, and means for automatically deenergizing said heating elements when the temperature of said welded joint rises to a predetermined value.

8. The method of reducing thermal stresses in a welded joint between dissimilar metal tubular fluid conduit members having different thermal coefficients of expansion and normally subject to cyclic internal temperature conditions which comprises heating the portions of said fluid conduit members adjoining the weld whenever the joint metal temperature drops to a predetermined value and terminating said heating whenever the joint metal temperature rises to a predetermined value.

9. The method of reducing thermal stresses in a welded joint between dissimilar metal tubular fluid conduit members having different thermal coefficients of expansion and normally subject to cyclic internal temperature conditions which comprises automatically electrically heating by radiation uniformly to the portions of said fluid conduit members adjoining the weld whenever the joint metal temperature drops to a predetermined value and automatically terminating said electric heating whenever the joint metal temperature rises to a predetermined value.

PAUL M. BRISTER.
LAMBERT F. KOOISTRA.

References Cited in the file of this patent
UNITED STATES PATENTS

| Number | Name | Date |
|---|---|---|
| 2,044,734 | Newhouse | June 16, 1936 |
| 2,133,926 | Ransom, Jr., et al. | Oct. 18, 1938 |